(12) United States Patent
Shiina et al.

(10) Patent No.: US 8,857,547 B1
(45) Date of Patent: Oct. 14, 2014

(54) WHEEL LOADER

(71) Applicant: Komatsu Ltd., Tokyo (JP)

(72) Inventors: Toru Shiina, Komatsu (JP); Hirotaka Takahashi, Komatsu (JP); Kazunori Kamei, Kanazawa (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/122,460

(22) PCT Filed: Jul. 19, 2013

(86) PCT No.: PCT/JP2013/069696
§ 371 (c)(1),
(2), (4) Date: Nov. 26, 2013

(51) Int. Cl.
*B60K 13/02* (2006.01)

(52) U.S. Cl.
USPC ........................................ 180/68.3

(58) Field of Classification Search
CPC ...... B60K 13/02; B62D 25/105; B62D 25/10; B62D 25/12; F02M 35/00; F02M 35/162; F02M 35/164; F02M 35/161; F02M 35/0201; F02M 35/08; F02M 35/088
USPC ......... 180/68.3, 68.1, 68.2, 68.6, 69.2, 69.24, 180/69.25, 89.1, 89.2, 89.12, 89.17; 123/198 E
See application file for complete search history.

(56) References Cited

U.S. PATENT DOCUMENTS

| | | | | |
|---|---|---|---|---|
| 3,737,002 A | * | 6/1973 | Yotsumoto | 180/68.3 |
| 4,013,137 A | * | 3/1977 | Petersen | 180/68.3 |
| 4,215,665 A | * | 8/1980 | Stambaugh | 123/198 E |
| 4,327,680 A | * | 5/1982 | Dauwalder | 123/198 E |
| 5,022,479 A | * | 6/1991 | Kiser et al. | 180/68.3 |
| 5,660,243 A | * | 8/1997 | Anzalone et al. | 180/68.1 |
| 6,453,866 B1 | * | 9/2002 | Altmann et al. | 123/184.21 |
| 6,484,835 B1 | * | 11/2002 | Krapfl et al. | 180/68.3 |
| 6,655,486 B2 | * | 12/2003 | Oshikawa et al. | 180/68.1 |

(Continued)

FOREIGN PATENT DOCUMENTS

| | | |
|---|---|---|
| JP | 57-86831 U | 5/1982 |
| JP | 59-5424 U | 1/1984 |

(Continued)

OTHER PUBLICATIONS

International Search Report for PCT/JP2013/069696, issued on Oct. 22, 2013.

(Continued)

*Primary Examiner* — J. Allen Shriver, II
*Assistant Examiner* — James M Dolak
(74) *Attorney, Agent, or Firm* — Global IP Counselors, LLP (57) ABSTRACT

A wheel loader includes a vehicle cover defining an engine compartment, an engine arranged inside the engine compartment, an air cleaner, a cover member, and a shielding member. The vehicle cover includes a top plate having an opening section. The air cleaner includes an air cleaner body and an intake tube. The air cleaner body is arranged inside the engine compartment to clean air supplied to the engine. The intake tube has an intake port facing upward. The intake tube protrudes upward from the top plate via the opening section. The cover member has an inlet port to take in air. The cover member is installed on the top plate and covers a surrounding area and a top of the intake tube. The shielding member has a first inclined surface inclined downward toward a first direction. The shielding member is arranged above the intake port in the cover member.

11 Claims, 7 Drawing Sheets

(56) References Cited

U.S. PATENT DOCUMENTS

| | | | |
|---|---|---|---|
| 7,861,814 B2 * | 1/2011 | Hageman et al. | 180/68.1 |
| 8,181,728 B2 * | 5/2012 | Hartland et al. | 180/68.3 |
| 8,540,043 B2 * | 9/2013 | Mehlos et al. | 180/69.25 |
| 2009/0178880 A1 | 7/2009 | Uemura et al. | |

FOREIGN PATENT DOCUMENTS

| | | |
|---|---|---|
| JP | 2-115958 U | 9/1990 |
| JP | 09-88121 A | 3/1997 |
| JP | 2006-28873 A | 2/2006 |
| JP | 2007-187040 A | 7/2007 |
| JP | 2008-254519 A | 10/2008 |

OTHER PUBLICATIONS

The extended European search report for the corresponding European application No. 13798230.2, issued on Jul. 16, 2014.

* cited by examiner

WHEEL LOADER

CROSS-REFERENCE TO RELATED APPLICATIONS

This application is a U.S. National stage application of International Application No. PCT/JP2013/069696, filed on Jul. 19, 2013.

BACKGROUND

1. Field of the Invention

The present invention relates to a wheel loader.

2. Background Information

A wheel loader has an air cleaner for cleaning air which is supplied to an engine. For example, in the wheel loader which is disclosed in FIG. 6 and FIG. 7 of Japanese Unexamined Patent Application Publication No. H9-88121, the air cleaner is arranged inside an engine room. Then, an intake pipe is installed in the ceiling wall of the engine room. The intake pipe sucks in air from outside the engine room and supplies the sucked-in air to the air cleaner inside the engine room. In addition, in order to prevent the entry of rainwater, a cap with a mushroom shape is mounted onto the end portion of the intake pipe.

SUMMARY

The wheel loader described above is configured so as to prevent rainwater from entering inside the air cleaner, but there are problems during storms or the like such that rainwater enters inside an intake pipe due to rain being blown in from the side or due to rain rebounding off a vehicle cover or the like of the wheel loader.

An object of the present invention is to more reliably prevent liquid such as rainwater from entering an air cleaner.

A wheel loader according to an aspect of the present invention is provided with a vehicle cover, an engine, an air cleaner, a cover member, and a shielding member. The vehicle cover has a top plate with an opening section. The vehicle cover defines an engine compartment. The engine is arranged inside the engine compartment. The air cleaner has an air cleaner body and an intake tube. The air cleaner body is arranged inside the engine compartment and cleans outside air which is supplied to the engine. The intake tube includes an intake port, which faces upward, and protrudes upward from the top plate via the opening section. The cover member has an inlet port for taking in outside air. The cover member is installed on the top plate. The cover member covers the surroundings and the top of the intake tube. The shielding member is arranged above the intake port inside the cover member. In addition, the shielding member has a first inclined surface which is inclined downward toward a first direction.

According to this configuration, since the shielding member is arranged so as to cover the top of the intake port, rainwater or the like which enters inside the cover member via the inlet port in the cover member is blocked by the shielding member and does not enter inside the air cleaner from the intake port. In addition, since the shielding member has the first inclined surface which is inclined downward toward the first direction, it is possible for rainwater which is blocked by the shielding member to flow toward the first direction.

It is preferable that the shielding member be arranged with a gap between the cover member and the end edge of the shielding member in the first direction side. According to this configuration, it is possible for rainwater to flow downward via the gap between the shielding member and the cover member. In addition, it is possible to set the gap between the shielding member and the cover member as a flow path for supplying air which is taken inside the cover member to the air cleaner.

It is preferable that the shielding member further have a second inclined surface which is inclined downward toward a second direction which is the opposite side to the first direction. The first inclined surface has an area which is larger than the second inclined surface in a planar view. According to this configuration, it is possible for most of the rainwater which entered inside the cover member to flow in the first direction due to the first inclined surface. In addition, since the second inclined surface which is inclined toward the second direction is formed, it is possible for rainwater to flow in the second direction due to the second inclined surface. As a result, it is possible to more reliably prevent rainwater from entering inside the air cleaner.

It is preferable that the shielding member be arranged with a gap between the cover member and the end edge of the shielding member in the second direction side. According to this configuration, rainwater flows and falls downward in the second direction via the gap between the shielding member and the cover member. In addition, it is possible to set the gap between the shielding member and the cover member as a flow path for supplying air which is taken inside the cover member to the air cleaner.

It is preferable that the opening section be formed in the front section of the top plate, and the first inclined surface incline downward toward the front. According to this configuration, rainwater which is blocked by the shielding member flows toward the front on the top plate when discharged from the cover member. Here, since the opening section is formed at the front section of the top plate, the distance which the rainwater which is discharged from the cover member flows on the top plate is shorter to the front than to the rear. As such, it is possible to reduce the area in the top plate which is fouled due to rainwater.

It is preferable that the first inclined surface be positioned above the intake port. According to this configuration, it is possible to block rainwater using the first inclined surface.

It is preferable that a water draining hole be formed at the lower end portion of the cover member on the first direction side. According to this configuration, rainwater which flows and falls downward from the first inclined surface in the first direction is discharged to the outside of the cover member via the water draining hole.

It is preferable that the wheel loader be further provided with a partition member. The partition member is installed between the cover member and the opening section on the first direction side. The partition member extends upward from a bottom plate of the cover member or the top plate. An upper end of the partition member is positioned below the shielding member. According to this configuration, it is possible to prevent rainwater which flows and falls from the first inclined surface from entering inside the engine compartment via the opening section using the partition member.

It is preferable that the partition member be configured such that an upper end portion of the partition member surrounds the surroundings of an upper end portion of the intake tube. Then, the wheel loader is further provided with an elastic member which fills in between the upper end portion of the partition member and the upper end portion of the intake tube. According to this configuration, it is possible to prevent rainwater from entering from between the upper end portion of the partition member and the upper end portion of the intake tube using the elastic member.

It is preferable that the cover member be configured such that the area in a planar view is reduced heading upward. According to this configuration, since it is possible to reduce the area of the upper surface of the cover member, it is possible to suppress rainwater from rebounding off the upper surface of the cover member. As a result, it is possible to suppress rainwater which rebounds off the upper surface of the cover member from entering inside the cover member via the inlet port.

It is preferable that both end edges of the first inclined surface in a direction which is perpendicular with the first direction come into contact with the cover member except for the end portion on the first direction side. Then, the first inclined surface is configured such that the shape which is viewed from the first direction is a V shape. According to this configuration, since neither of the end edges of the first inclined surface come into contact with the cover member at the first side end portion, it is possible to set the portion where there is no contact as a flow path for air which is supplied to the air cleaner. In addition, since the first inclined surface has a V shape when viewed from the first direction, rainwater which is blocked by the first inclined surface is gathered in a valley portion and flows to the first direction side. That is, the rainwater does not flow along both end edges of the first inclined surface in a direction which is perpendicular with the first direction. As a result, it is possible to prevent rainwater from flowing and falling from the end portion on the first direction side at both end edges of the first inclined surface, which is formed as a flow path for air as described above.

According to the present invention, it is possible to more reliably prevent liquid such as rainwater from entering inside an air cleaner.

DETAILED DESCRIPTION OF THE EMBODIMENTS

Figure 1:
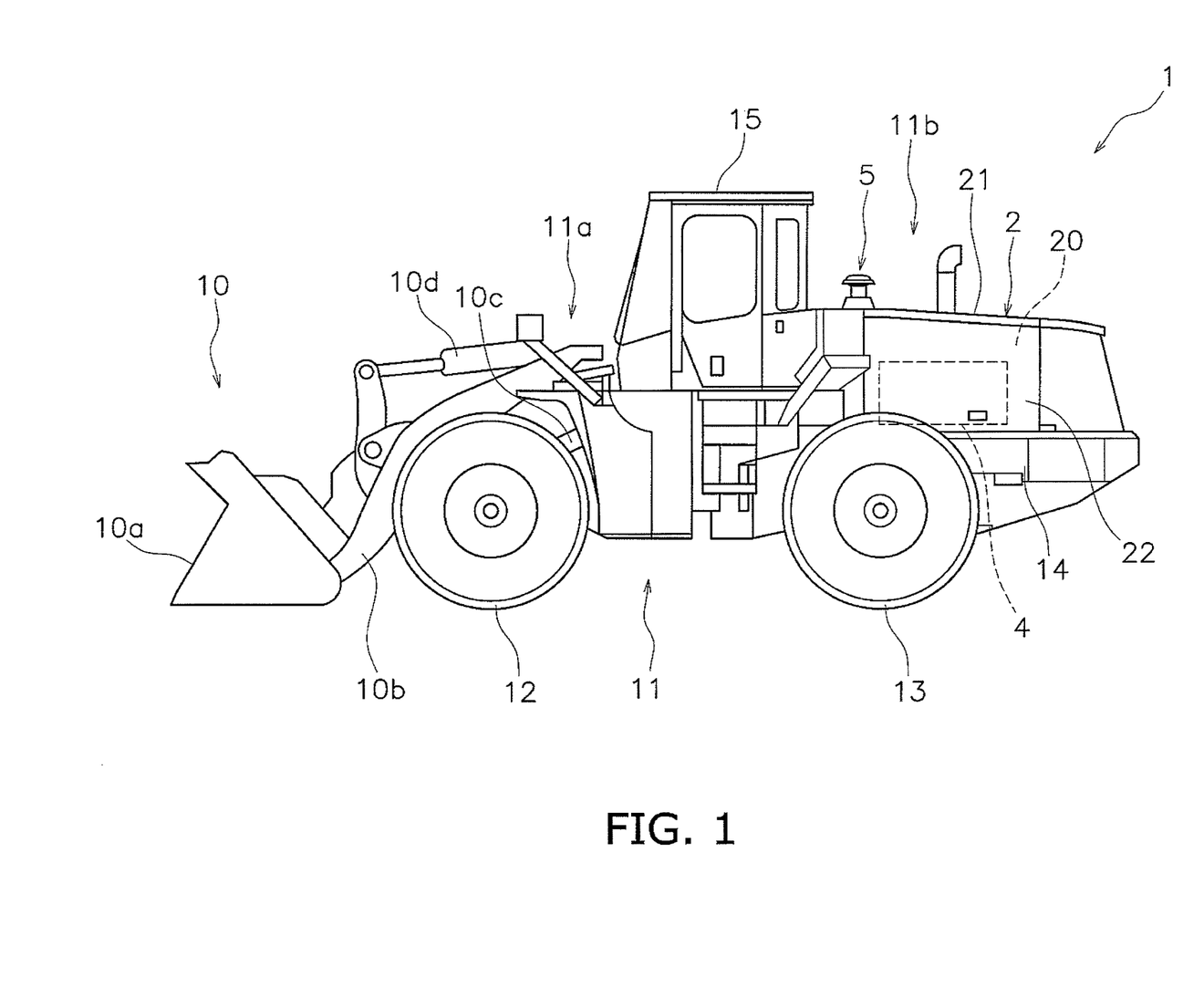
FIG. 1 is a side view of a wheel loader.

Below, an embodiment of a wheel loader according to the present invention will be described with reference to the drawings. FIG. 1 is a side view of the wheel loader viewed from the left side.

Here, "front" and "back" in the following description have the meaning of the front and back of a vehicle body 11. That is, the left in FIG. 1 is the "front" and the right in FIG. 1 is the "back". In addition, "right", "left", "up", and "down" in the following description use a direction looking forward from an operator cab as a reference and the "vehicle width direction" has the same meaning as the "left and right direction". In addition, the front and back direction has the meaning of the front and back direction of the vehicle.

As shown in FIG. 1, a wheel loader 1 has a work implement 10, the vehicle body 11, front wheels 12, and rear wheels 13. It is possible for the wheel loader 1 to move itself by the rotational driving of the front wheels 12 and the rear wheels 13, and a desired operation is performed using the work implement 10.

The work implement 10 is a mechanism which is driven by hydraulic oil which is pressurized by a hydraulic pump (not shown) and is arranged at the front of the vehicle body 11. The work implement 10 has a bucket 10a, a boom 10b, a lift cylinder 10c, and a bucket cylinder 10d. The bucket 10a is attached to the front end of the boom 10b. The boom 10b is a member for lifting up the bucket 10a and is mounted onto a front section of a front section vehicle body 11a which will be described later. The lift cylinder 10c drives the boom 10b using the hydraulic oil which is discharged from the hydraulic pump. The bucket cylinder 10d drives the bucket 10a using the hydraulic oil which is discharged from the hydraulic pump.

The vehicle body 11 has a front section vehicle body 11a and a rear section vehicle body 11b. The front section vehicle body 11a and the rear section vehicle body 11b are joined to each other so as to be able to swing in the left and right direction. The work implement 10 and the front wheels 12 are provided in the front section vehicle body 11a and the rear wheels 13 are provided in the rear section vehicle body 11b.

The rear section vehicle body 11b has a rear frame 14, a cab 15, and a vehicle cover 2. The rear frame 14 is a frame which configures the overall shape of the rear section vehicle body 11b and supports the rear wheels 13, the cab 15, the vehicle cover 2, and the like. The cab 15 is installed in the front section of the rear section vehicle body 11b. The operator cab is provided in the inner section of the cab 15 and various types of operation members and operation panels are also provided.

Figure 2:
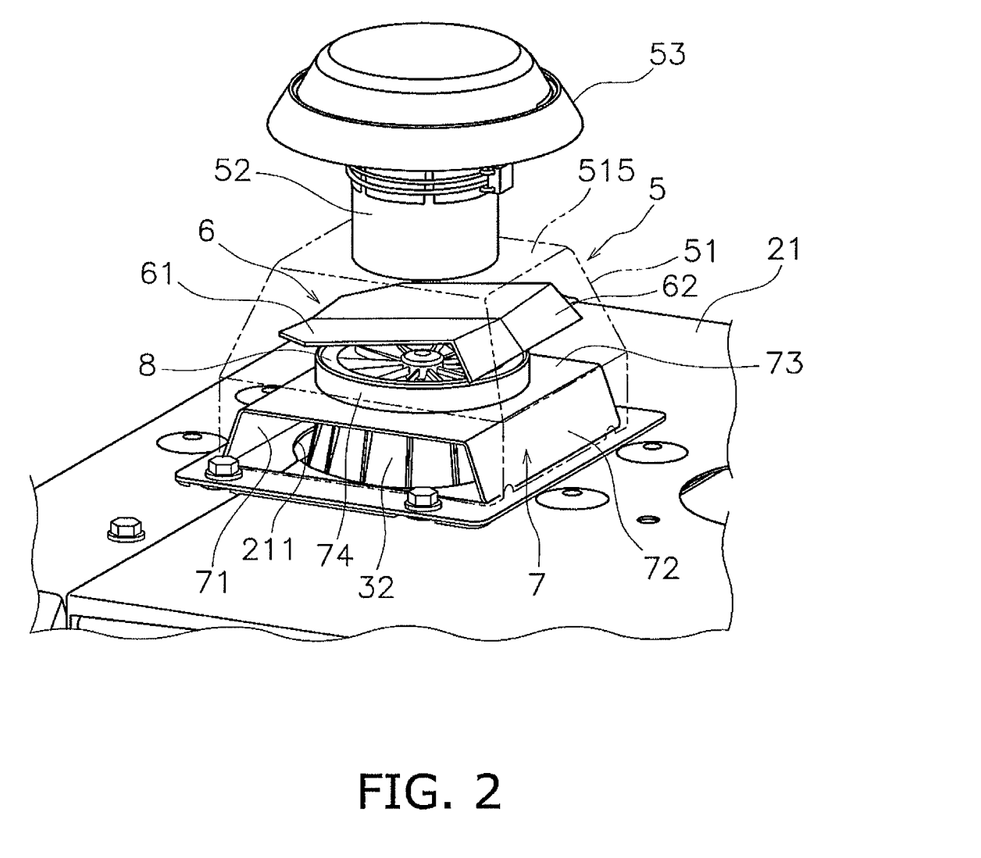
FIG. 2 is a perspective view of the surroundings of a cover member.

The vehicle cover 2 defines an engine compartment 20 which is the inner section, and an air cleaner 3 and an engine 4 are accommodated inside the engine compartment 20. The vehicle cover 2 has a top plate 21 and a pair of side plates 22. The top plate 21 is a member with a plate shape which defines the upper surface of the engine compartment 20, and the pair of side plates 22 are members with a plate shape which define both side surfaces of the engine compartment 20. As shown in FIG. 2, an opening section 211 with a circular shape is formed at the front section of the top plate 21. Here, FIG. 2 is a perspective view illustrating the surroundings of a cover member 5 viewed from the left rear. In FIG. 2, for convenience of description, only the outline of a body section 51 of the cover member 5 is indicated with a two-dot chain line.

Figure 3:
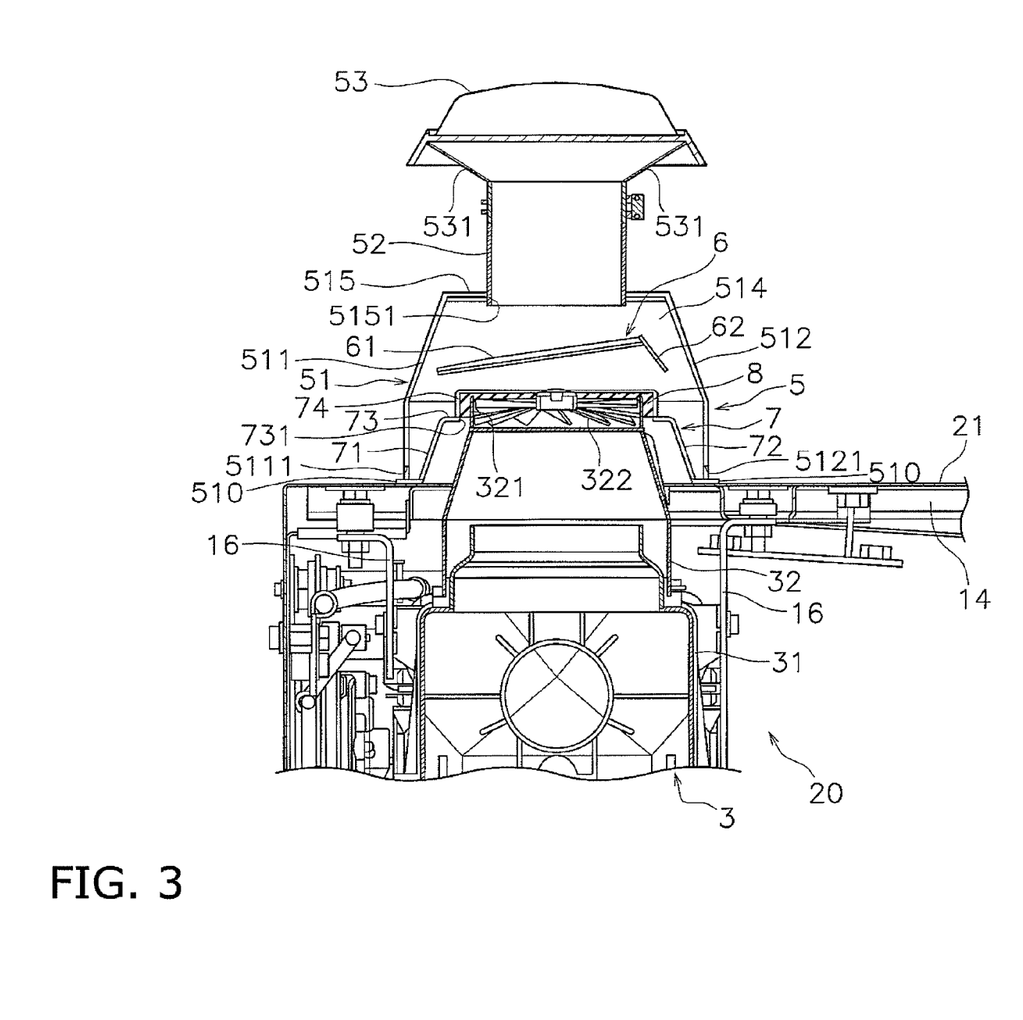
FIG. 3 is a side cross sectional view of the surroundings of a cover member.

FIG. 3 is a side cross sectional view which illustrates the surroundings of the cover member 5 viewed from the left side. As shown in FIG. 3, the air cleaner 3 is arranged inside the engine compartment 20, except for a portion. Here, the air cleaner 3 is attached so as to be able to be hung on the rear frame 14 using a plurality of attachment tools 16.

Figure 4:
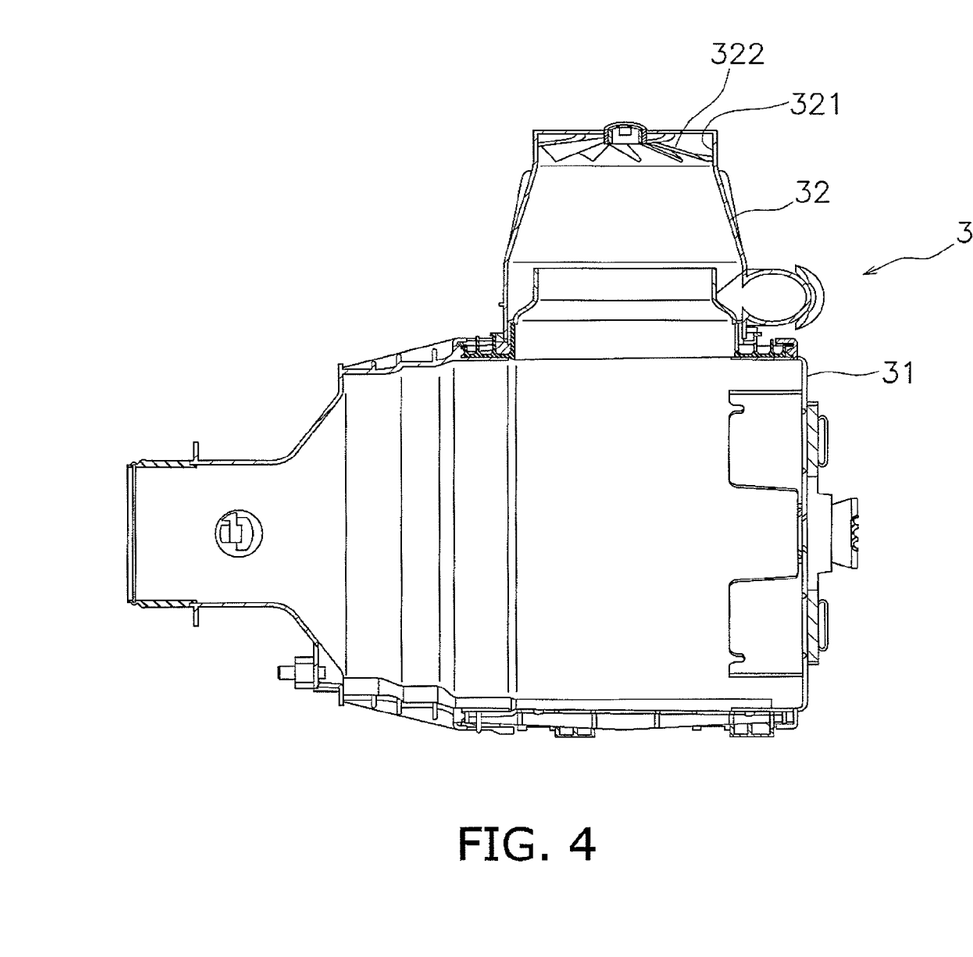
FIG. 4 is a rear cross sectional view of an air cleaner.

FIG. 4 is a cross sectional view of the air cleaner 3 viewed from the rear. As shown in FIG. 4, the air cleaner 3 has an air cleaner body 31 and an intake tube 32. The air cleaner body 31 is arranged inside the engine compartment 20 and cleans air which is supplied to the engine 4. In more detail, the air cleaner body 31 has a filter (not shown) in an inner section and air which is sucked into the inner section via the intake tube 32 is filtered and supplied to the engine 4.

The intake tube 32 is mounted onto the upper section of the air cleaner body 31. The intake tube 32 is formed so as to extend upward from the air cleaner body 31 and the inner section of the intake tube 32 and the inner section of the air cleaner body 31 are linked. The upper section of the intake tube 32 protrudes upward from the top plate 21 by passing through the opening section 211 of the top plate 21. Here, a gap is formed between the outer wall surface of the intake tube 32 and the inner wall surface of the opening section 211 (refer to FIG. 2 and FIG. 3).

The intake tube 32 is formed in a substantially cylindrical shape. In more detail, the lower end portion and the upper end portion of the intake tube 32 have cylindrical shapes. The central portion of the intake tube 32 has a truncated cone shape where the diameter becomes smaller heading upward. The upper end portion of the intake tube 32 is a suction port 321 which faces upward and the intake tube 32 sucks in air from the suction port 321. A plurality of blade sections 322 which extend radially are fixed at the suction port 321. A revolving flow is generated by air, which is sucked in from the suction port 321 into the intake tube 32, passing through the blade sections 322. Due to the revolving flow, it is possible to separate dust or the like which is included in air which is sucked in.

Figure 5:
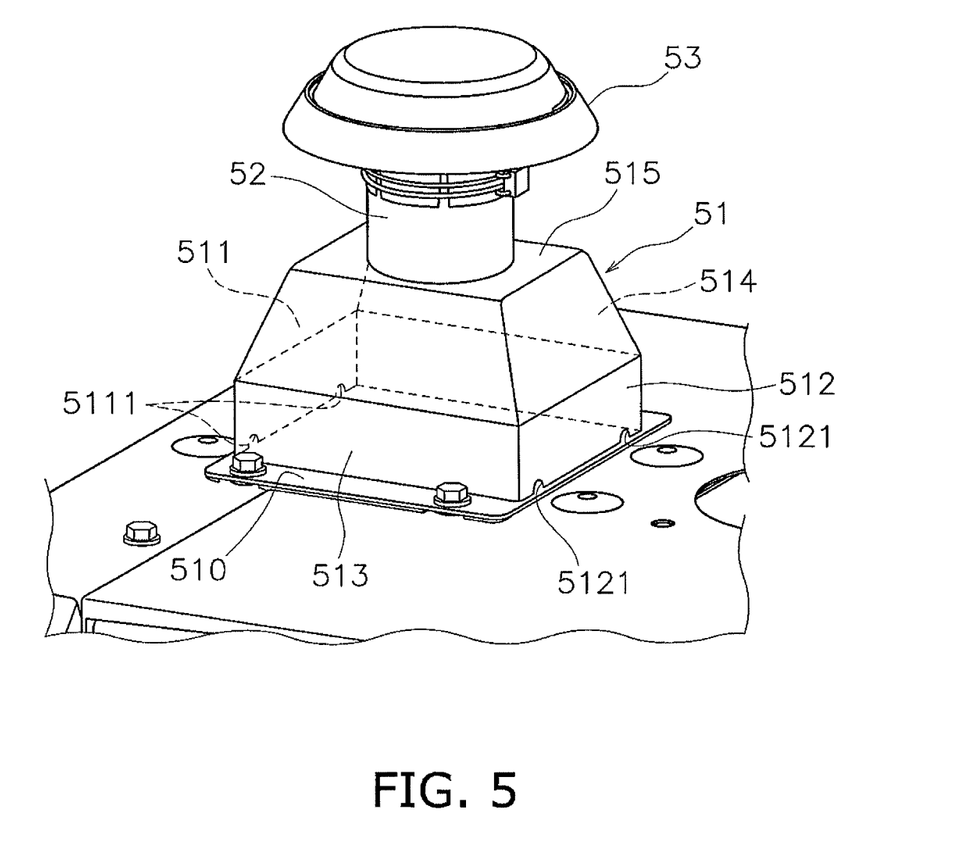
FIG. 5 is a perspective view of the surroundings of a cover member.

FIG. 5 is a perspective view illustrating the surroundings of the cover member 5 viewed from the left rear. As shown in FIG. 3 and FIG. 5, the cover member 5 is a member for covering the portion, which protrudes upward from the top plate 21 of the intake tube 32, and is installed on the top plate 21. The cover member 5 has the body section 51, a cylindrical section 52, and a cap section 53.

The body section 51 is formed in a box shape which is substantially rectangular. In more detail, the lower section of the body section 51 is formed in a rectangular shape and the upper section is formed in a truncated pyramid shape. As a result, the upper surface of the body section 51 has a smaller area in a planar view than the bottom surface. In addition, the body section 51 is configured by a bottom plate 510, a front plate 511, a rear plate 512, a pair of side plates 513 and 514, and an upper plate 515. The bottom plate 510 has a rectangular frame shape and a rectangular opening is formed in the center. The opening section 211 of the top plate 21 is exposed from the opening of the bottom plate 510. The front plate 511, the rear plate 512, and the pair of side plates 513 and 514 extend upward from the bottom plate 510. A linking port 5151 (refer to FIG. 3) with a circular shape is formed in the center of the upper plate 515. In the front plate 511, a water draining hole 5111 is formed in each of the lower end portions of both end portions in the vehicle width direction. In the same manner, in the rear plate 512, a water draining hole 5121 is formed in each of the lower end portions of both end portions in the vehicle width direction. In addition, the opening section 211 of the top plate 21 is accommodated inside the body section 51.

As shown in FIG. 2 and FIG. 3, the cylindrical section 52 is a member with a cylindrical shape which extends upward from the linking port 5151. The cap section 53 is mounted onto the upper section of the cylindrical section 52. The cap section 53 has a plurality of inlet ports 531 which open downward and air is taken inside the cover member 5 from the inlet ports 531.

A shielding member 6 is installed inside the cover member 5. The shielding member 6 is arranged so as to cover the top of the suction port 321 of the intake tube 32. In addition, the shielding member 6 is arranged so as to cover the bottom of the cylindrical section 52. Due to this, liquid such as rainwater which falls down from the cylindrical section 52 does not flow and fall inside the suction port 321 due to being blocked by the shielding member 6.

The shielding member 6 extends to span between the pair of side plates 513 and 514. The shielding member 6 is fixed by welding or the like to each of the side plates 513 and 514. The shielding member 6 has a first inclined surface 61 and a second inclined surface 62. The first inclined surface 61 covers the top of the suction port 321 and the area of the first inclined surface 61 is larger than the second inclined surface 62 in a planar view.

The first inclined surface 61 is inclined downward toward the front (an example of the first direction). A gap is formed between the front end of the first inclined surface 61 and the front plate 511. The gap is a flow path for air, which is taken inside the cover member 5 from each of the inlet ports 531 of the cap section 53, to flow to the suction port 321.

Figure 6:
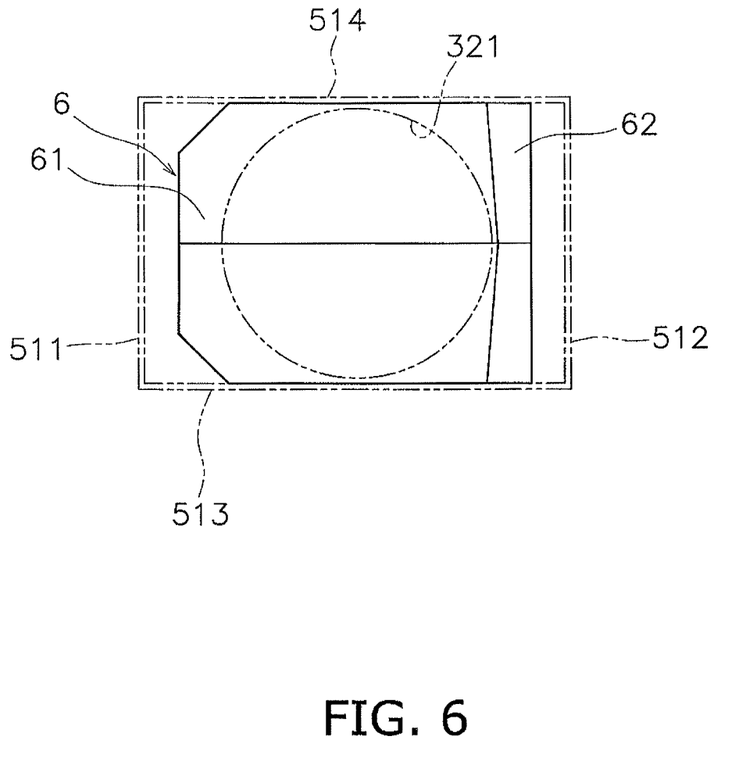
FIG. 6 is a plan view of a shielding member.

In addition, the first inclined surface 61 is formed in a V shape when viewed from the front. That is, the first inclined surface 61 is inclined so as to incline downward toward the center in a direction (the vehicle width direction) which is orthogonal with the direction toward the front. FIG. 6 is a plan view of the shielding member 6. As shown in FIG. 6, both end edges of the first inclined surface 61 in the vehicle width direction are welded to each of the side plates 513 and 514, and the gaps are formed between each of the front end portions of both end edges in the vehicle width direction and each of the side plates 513 and 514. Each of the gaps is also a flow path for air, which is taken inside the cover member 5 from each of the inlet ports 531 of the cap section 53, to flow inside the suction port 321. Here, the first inclined surface 61 covers the top of the suction port 321.

The second inclined surface 62 of the shielding member 6 is inclined downward toward the rear (an example of the second direction) from the rear end of the first inclined surface 61. In addition, both end edges of the second inclined surface 62 in the vehicle width direction are welded to each of the side plates 513 and 514. A gap is formed by the rear end of the second inclined surface 62 with the rear plate 512 of the body section 51. The gap is also a flow path for air, which is taken inside the cover member 5 from each of the inlet ports 531 of the cap section 53, to flow to the suction port 321. The inclining angle of the second inclined surface 62 is steeper than the inclining angle of the first inclined surface 61. That is, the angle between the horizontal plane and the first inclined surface 61 is smaller than the angle between the horizontal plane and the second inclined surface 62.

In order to prevent rainwater or the like from entering inside the engine compartment 20 from the opening section 211 of the top plate 21, a partition member 7 is installed inside the cover member 5. The partition member 7 has a first partition plate 71, a second partition plate 72, a joining plate 73, and a protruding section 74.

The first partition plate 71 is a plate with a rectangular shape. The first partition plate 71 is positioned between the front plate 511 and the opening section 211, and extends upward from the bottom plate 510 of the cover member 5. In addition, the first partition plate 71 extends to span between the pair of side plates 513 and 514 in the vehicle width direction. Then, the entirety of both end edges of the first partition plate 71 in the vehicle width direction is fixed to the pair of side plates 513 and 514 by welding or the like. In addition, the first partition plate 71 is inclined to the rear and upward. The upper end of the first partition plate 71 has the same position as the front end of the first inclined surface 61 in the front and back direction or is positioned to the rear of the front end of the first inclined surface 61 in the front and back direction. As a result, rainwater which flows and falls from the front end of the first inclined surface 61 does not fall to the rear of the first partition plate 71.

The second partition plate 72 is a plate with a rectangular shape. The second partition plate 72 is positioned between the rear plate 512 and the opening section 211, and extends upward from the top plate 21. In addition, the second partition plate 72 extends to span between the pair of side plates 513 and 514 in the vehicle width direction. Then, the entirety of both end edges of the second partition plate 72 in the vehicle width direction is fixed to the pair of side plates 513 and 514 by welding or the like. In addition, the second partition plate 72 is inclined forward and upward.

The joining plate 73 is a plate with a rectangular shape which extends in parallel with the horizontal plane so as to join with the upper end of the first partition plate 71 and the upper end of the second partition plate 72. The joining plate 73 extends to span between the pair of side plates 513 and 514 in the vehicle width direction. Then, the entirety of both end edges of the joining plate 73 in the vehicle width direction is fixed to the pair of side plates 513 and 514 by welding or the like. The central portion of the joining plate 73 has a through hole 731 with a circular shape and the upper end portion of the intake tube 32 passes through the joining plate 73 via the through hole 731.

The protruding section 74 which is the upper end portion of the partition member 7 is a portion, which protrudes upward from the surrounding section of the through hole 731 of the joining plate 73, and is formed in a cylindrical shape. The protruding section 74 is configured so as to surround the surroundings of the upper end portion of the intake tube 32. Then, an elastic member 8 is provided so as to fill in the gap between the protruding section 74 and the upper end portion of the intake tube 32. It is possible to preferably form the elastic member 8 from rubber such as synthetic rubber or natural rubber or it is possible to more preferably form the elastic member 8 using sponge rubber or the like.

Characteristics

The wheel loader 1 according to the present embodiment has the following characteristics.

(1) Since the shielding member 6 is arranged so as to cover the top of the suction port 321, rainwater or the like which enters inside the cover member 5 via the inlet port 531 is blocked by the shielding member 6 and does not enter inside the air cleaner body 31 from the suction port 321. In addition, since the shielding member 6 has the first inclined surface 61 which is inclined downward and toward the front, it is possible for the rainwater which is blocked by the shielding member 6 to flow toward the front. Here, since the shielding member 6 is arranged to have the gap with the cover member 5 in the front, rainwater flows and falls downward via the gap between the shielding member 6 and the cover member 5. In addition, it is possible to set the gap between the shielding member 6 and the cover member 5 as the flow path for supplying air which is taken inside the cover member 5 to the air cleaner 3.

(2) In the shielding member 6, since the first inclined surface 61 has a larger area in a planar view compared to the second inclined surface 62, it is possible for most of the rainwater which enters inside the cover member 5 to flow to the front side due to the first inclined surface 61. In addition, since the second inclined surface 62 which is inclined toward the rear is formed, it is possible for the rainwater to flow to the rear due to the second inclined surface 62. As a result, it is possible to more reliably prevent rainwater from entering inside the air cleaner 3.

(3) When rainwater which is blocked by the shielding member 6 is discharged from the cover member 5, rainwater flows toward the front on the top plate 21. Here, since the opening section 211 is formed in the front section of the top plate 21, the distance which the rainwater which is discharged from the cover member 5 flows on the top plate 21 is shorter to the front than to the rear. As such, it is possible to reduce the area in the top plate 21 which is fouled due to the rainwater.

(4) Rainwater which flows and falls downward from the front of the first inclined surface 61 is discharged to the outside of the cover member 5 via two water draining holes 5111 which are formed in the front plate 511. In addition, rainwater which flows and falls downward from the rear of the second inclined surface 62 is discharged to the outside of the cover member 5 via two water draining holes 5121 which are formed in the rear plate 512.

(5) The partition member 7 is installed on the front side between the front plate 511 of the cover member 5 and the opening section 211. The partition member 7 extends upward from the top plate 21. The upper end of the partition member 7 is positioned below the shielding member 6. As a result, it is possible to prevent rainwater which flows and falls from the first inclined surface 61 from entering inside the engine compartment 20 via the opening section 211 using the partition member 7.

(6) In the partition member 7, the protruding section 74 is configured so as to surround the surroundings of the upper end portion of the intake tube 32. Then, the elastic member 8 is provided so as to fill in between the protruding section 74 and the upper end portion of the intake tube 32. As a result, it is possible to prevent rainwater from entering between the protruding section 74 and the upper end portion of the intake tube 32 using the elastic member 8. In addition, it is possible to prevent the air which flows in from inside the engine compartment 20 via the opening section 211 and the inside of the partition member 7 from being sucked in from the suction port 321 using the elastic member 8.

(7) The cover member 5 is configured such that the area in a planar view is reduced heading upward. That is, it is possible for the area of the upper plate 515 of the cover member 5 to be reduced. As a result, it is possible to suppress rainwater from rebounding off the upper plate 515 of the cover member 5. As a result, it is possible to suppress rainwater which rebounds off the upper plate 515 of the cover member 5 from entering inside the cover member 5 via the inlet port 531.

MODIFIED EXAMPLES

Above, an embodiment of the present embodiment is described, but the present invention is not limited to the embodiment and various modifications are possible without departing from the gist of the present invention.

Modified Example 1

In the embodiment described above, the shielding member 6 has the first inclined surface 61 and the second inclined surface 62, but the present invention is not particularly limited to this. For example, the shielding member 6 may have only the first inclined surface 61.

Modified Example 2

In the embodiment described above, the air cleaner 3 is configured with the air cleaner body 31 and the intake tube 32 as separate members, but the present invention is not particularly limited to this and the air cleaner body 31 and the intake tube 32 may be formed integrally.

Modified Example 3

In the embodiment described above, the first inclined surface 61 of the shielding member 6 is inclined downward toward the front as the first direction, but the present invention is not particularly limited to this. For example, the first inclined surface 61 may be inclined downward toward the rear or may be inclined downward toward the side.

Modified Example 4

In the embodiment described above, the body section 51 of the cover member 5 has a shape which is substantially rectangular, but the present invention is not particularly limited to this. For example, it is possible for the body section 51 of the cover member 5 to have a shape which is substantially cylindrical. In this case, it is preferable that the lower section of the body section 51 have a cylindrical shape and the upper section of the body section 51 have a truncated cone shape.

Modified Example 5

In the embodiment described above, the first partition plate 71 and the second partition plate 72 extend upward from the bottom plate 51 of the cover member 5, but the present invention is not particularly limited to this. For example, the first partition plate 71 and the second partition plate 72 may extend upward from the top plate 21.

Modified Example 6

Figure 7:
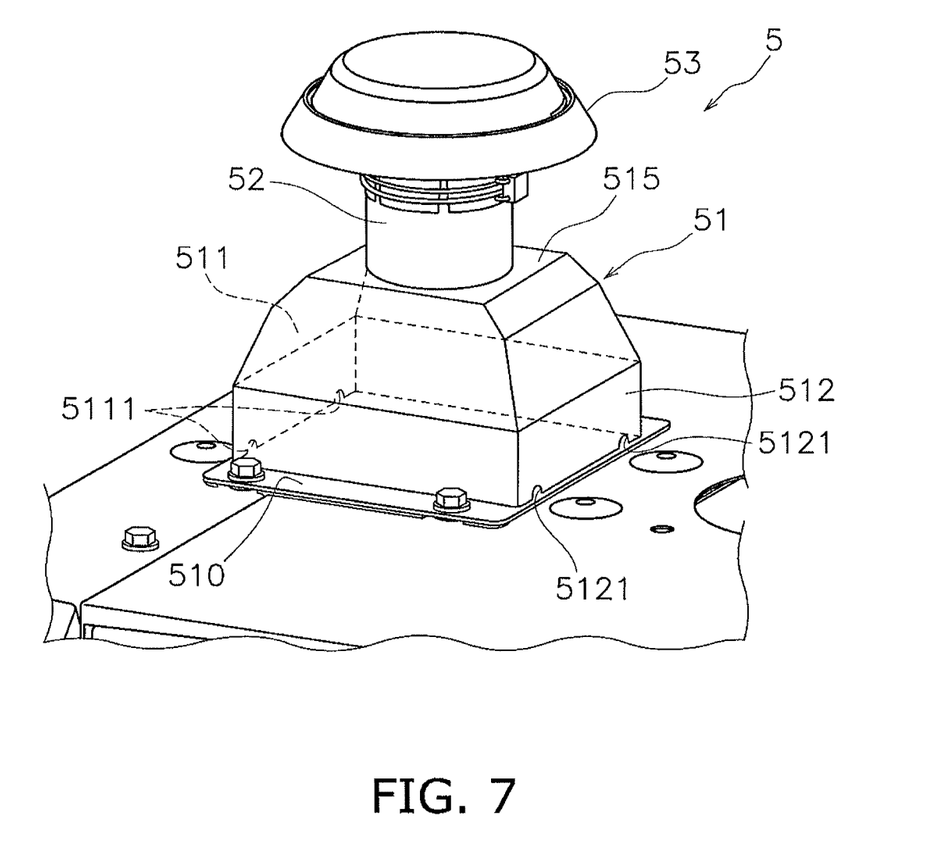
FIG. 7 is a perspective view of the surroundings of a cover member according to a modified example 6.

FIG. 7 is a perspective view of the surroundings of a cover member according to a modified example 6. In the embodiment described above, since the upper section of the body section 51 is formed in a truncated pyramid shape, the upper section of the front plate 511 is inclined to the rear and the upper section of the rear plate 512 is inclined to the front. In contrast to this, in the cover member 5 according to the modified example 6, the upper end portion of the upper section of the front plate 511 is further inclined to the rear. That is, the upper section of the front plate 511 is inclined to the rear in two stages. In addition, the upper end portion of the upper section of the rear plate 512 is further inclined to the front. That is, the upper section of the rear plate 512 is inclined to the front in two stages. According to this configuration, since the area of the upper plate 515 is reduced compared to the embodiment described above, for example, when snow falls, it is possible to reduce the amount of snow which accumulates on the upper plate 515.

Modified Example 7

In the embodiment described above, a gap is formed between the front end of the shielding member 6 and the front plate 511, but the present invention is not particularly limited to this. For example, a gap need not be formed between the front end of the shielding member 6 and the front plate 511. In this case, in order to secure the flow path for rainwater and air, a through hole may be formed in the front end portion of the shielding member 6.

The invention claimed is:

1. A wheel loader comprising:
a vehicle cover including a top plate having an opening section, the vehicle cover defining an engine compartment;
an engine arranged inside the engine compartment;
an air cleaner including an air cleaner body and an intake tube, the air cleaner body being arranged inside the engine compartment, the air cleaner body being configured to clean air supplied to the engine, the intake tube having an intake port facing upward, the intake tube protruding upward from the top plate via the opening section;
a cover member having an inlet port configured to take in air, the cover member being installed on the top plate, the cover member covering a surrounding area of a top of the intake tube and the top of the intake tube; and
a shielding member having a first inclined surface inclined downward toward a first direction, the shielding member being arranged above the intake port in the cover member.

2. The wheel loader according to claim 1, wherein
the shielding member is arranged with a gap between an end edge of the shielding member and the cover member on a first direction side thereof.

3. The wheel loader according to claim 1, wherein
the shielding member further has a second inclined surface inclined downward toward a second direction opposite to the first direction, and
the first inclined surface has an area which is larger than the second inclined surface as viewed in a planar view.

4. The wheel loader according to claim 3, wherein
the shielding member is arranged with a gap between an end edge of the shielding member and the cover member on a second direction side thereof.

5. The wheel loader according to claim 1, wherein
the opening section is formed in a front section of the top plate, and
the first inclined surface inclines downward toward the front section.

6. The wheel loader according to claim 1, wherein
the first inclined surface is positioned above the intake port.

7. The wheel loader according to claim 1, wherein
a water draining hole is formed at a lower end portion of the cover member on a first direction side thereof.

8. The wheel loader according to claim 1, further comprising:
a partition member installed between the cover member and the opening section on a first direction side thereof, the partition member extending upward from a bottom of the cover member or the top plate,
an upper end of the partition member being positioned below the shielding member.

9. The wheel loader according to claim 8, further comprising:
an elastic member,
the partition member being configured such that an upper end portion of the partition member surrounds an upper end portion of the intake tube, and
the elastic member filling between the upper end portion of the partition member and the upper end portion of the intake tube.

10. The wheel loader according to claim 1, wherein
the cover member is configured such that an area as viewed in a planar view is reduced as the cover member extends upward.

11. The wheel loader according to claim 1, wherein
the first inclined surface has a pair of end edges along a direction perpendicular to the first direction, and both end edges come into contact with the cover member, and
the first inclined surface is configured with a V shape as viewed along the first direction.

* * * * *